(12) United States Patent
Nagaraj et al.

(10) Patent No.: US 9,023,486 B2
(45) Date of Patent: May 5, 2015

(54) THERMAL BARRIER COATING SYSTEMS AND PROCESSES THEREFOR

(75) Inventors: Bangalore Aswatha Nagaraj, West Chester, OH (US); Thomas John Tomlinson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 13/341,247

(22) Filed: Dec. 30, 2011

(65) Prior Publication Data
US 2013/0095344 A1 Apr. 18, 2013

Related U.S. Application Data

(60) Provisional application No. 61/546,798, filed on Oct. 13, 2011.

(51) Int. Cl.
| | | |
|---|---|---|
| *B32B 18/00* | (2006.01) | |
| *C23C 4/18* | (2006.01) | |
| *C23C 4/04* | (2006.01) | |
| *B32B 15/04* | (2006.01) | |
| *C23C 4/12* | (2006.01) | |
| *C23C 4/10* | (2006.01) | |
| *C04B 35/486* | (2006.01) | |
| *C04B 35/505* | (2006.01) | |

(Continued)

(52) U.S. Cl.
CPC . *C23C 4/105* (2013.01); *C23C 4/18* (2013.01); *C04B 35/486* (2013.01); *C04B 35/505* (2013.01); *C23C 4/02* (2013.01); *C23C 28/3215* (2013.01); *C23C 28/3455* (2013.01); *Y10T 428/12549* (2015.01); *Y10T 428/2495* (2015.01); *C04B 2235/3225* (2013.01); *C04B 2235/3244* (2013.01); *C04B 2235/76* (2013.01)

(58) Field of Classification Search
None
See application file for complete search history.

(56) References Cited

U.S. PATENT DOCUMENTS

| | | | |
|---|---|---|---|
| 5,073,433 | A | 12/1991 | Taylor |
| 5,238,752 | A | 8/1993 | Duderstadt et al. |

(Continued)

FOREIGN PATENT DOCUMENTS

| | | |
|---|---|---|
| CN | 1357642 A | 7/2002 |
| EP | 0 605 196 | 7/1994 |

(Continued)

OTHER PUBLICATIONS

Chen et al. Solid State Ionics, 170, 2004, 255-274.*

(Continued)

*Primary Examiner* — Vera Katz
(74) *Attorney, Agent, or Firm* — General Electric Company; Pamela A. Kachur

(57) ABSTRACT

Coating systems and processes by which the coating systems can be deposited to be resistant to contaminants, and particularly resistant to infiltration and damage caused by CMAS. The coating systems include inner and outer ceramic layers, each having a microstructure characterized by splats and horizontal porosity. The inner ceramic layer consists essentially of zirconia stabilized by about 6 to about 9 weight percent yttria. The outer ceramic layer overlies and contacts the inner ceramic layer to define the outermost surface of the coating system. The outer ceramic layer consists essentially of zirconia stabilized by about 25 to about 75 weight percent yttria, has a thickness that is less than the thickness of the inner ceramic layer, and has a porosity level that is lower than that of the inner ceramic layer.

13 Claims, 4 Drawing Sheets

(51) Int. Cl.
*C23C 4/02* (2006.01)
*C23C 28/00* (2006.01)

(56) References Cited

U.S. PATENT DOCUMENTS

| | | | |
|---|---|---|---|
| 5,520,516 | A | 5/1996 | Taylor et al. |
| 5,652,044 | A | 7/1997 | Rickerby |
| 5,660,885 | A | 8/1997 | Hasz et al. |
| 5,830,586 | A | 11/1998 | Gray et al. |
| 5,897,921 | A | 4/1999 | Borom et al. |
| 5,989,343 | A | 11/1999 | Borom et al. |
| 6,025,078 | A | 2/2000 | Rickerby et al. |
| 6,047,539 | A | 4/2000 | Farmer |
| 6,071,627 | A | 6/2000 | Yasuda et al. |
| 6,102,656 | A * | 8/2000 | Nissley et al. ............. 415/174.4 |
| 6,482,537 | B1 | 11/2002 | Strangman et al. |
| 6,764,779 | B1 | 7/2004 | Liu et al. |
| 6,890,668 | B2 | 5/2005 | Bruce et al. |
| 6,930,066 | B2 | 8/2005 | Subramanian |
| 6,982,126 | B2 | 1/2006 | Darolia et al. |
| 7,291,403 | B2 | 11/2007 | Nagaraj et al. |
| 7,785,722 | B2 | 8/2010 | Freling et al. |
| 7,862,901 | B2 | 1/2011 | Darolia et al. |
| 7,875,370 | B2 | 1/2011 | Schlichting et al. |
| 8,080,283 | B2 | 12/2011 | Schlichling et al. |
| 8,216,689 | B2 | 7/2012 | Witz et al. |
| 8,460,799 | B2 | 6/2013 | Arikawa et al. |
| 2005/0118334 | A1 | 6/2005 | Gorman et al. |
| 2005/0271886 | A1 | 12/2005 | Cetel |
| 2006/0093850 | A1 | 5/2006 | Darolia et al. |
| 2007/0160859 | A1 | 7/2007 | Darolia et al. |
| 2007/0172703 | A1 | 7/2007 | Freling et al. |
| 2008/0057326 | A1 | 3/2008 | Schlichting et al. |
| 2008/0145674 | A1* | 6/2008 | Darolia et al. ................ 428/433 |
| 2009/0162690 | A1 | 6/2009 | Nagaraj et al. |
| 2009/0162692 | A1 | 6/2009 | Nagaraj et al. |
| 2010/0154422 | A1* | 6/2010 | Kirby et al. ..................... 60/722 |
| 2011/0003119 | A1* | 1/2011 | Doesburg et al. ............. 428/155 |
| 2011/0033284 | A1 | 2/2011 | Tryon et al. |
| 2011/0086179 | A1 | 4/2011 | Schlichting et al. |
| 2011/0171488 | A1* | 7/2011 | Taylor ........................... 428/623 |
| 2011/0300357 | A1 | 12/2011 | Witz et al. |
| 2012/0034471 | A1* | 2/2012 | Peterson ....................... 428/457 |
| 2012/0122651 | A1 | 5/2012 | Taylor et al. |
| 2013/0095344 | A1 | 4/2013 | Nagaraj et al. |
| 2013/0130052 | A1 | 5/2013 | Menuey et al. |
| 2013/0224457 | A1 | 8/2013 | Lee |
| 2013/0295326 | A1 | 11/2013 | Doesburg et al. |

FOREIGN PATENT DOCUMENTS

| | | | |
|---|---|---|---|
| EP | 1683775 | A2 | 7/2006 |
| EP | 1731630 | A2 | 12/2006 |
| EP | 1811060 | A2 | 7/2007 |
| JP | 2007182631 | A | 7/2007 |
| JP | 2009286127 | A | 12/2009 |
| JP | 2010229471 | A | 10/2010 |
| JP | 2011012287 | A | 1/2011 |
| JP | 2011510167 | A | 3/2011 |
| JP | 2011512454 | A | 4/2011 |
| JP | 2011167994 | A | 9/2011 |
| JP | 2012512330 | A | 5/2012 |
| JP | 2013522462 | A | 6/2013 |
| JP | 2013540887 | A | 11/2013 |

OTHER PUBLICATIONS

S. Ahmaniemi, P. Vuoristo, T. Mantyla, "Improved sealing treatments for thick thermal barrier coatings", Institute of Materials Science, Tampere University of Technology, Tampere, Finland, Surface and Coatings Technology, 151-152 (2002) 412-417.

Ibegazene et al., "Yttria-Stabilized Hafnia-Zirconia Thermal Barrier Coatings: The Influence of Hafnia Addition on TBC Structure and High-Temperature Behaviour", Journal of Materials Science, vol. No. 30, Issue No. 4, pp. 938-951, Feb. 15, 1995.

Haynes et al., "Oxidation and Degradation of a Plasma-Sprayed Thermal Barrier Coating System", Surface and Coatings Technology, vol. No. 86-87, Part 1, pp. 102-108, Dec. 1, 1996.

Chen et al., "Thermodynamic Modeling of the ZrO2-YO1.5 System", Solid State Ionics, vol. No. 170, Issues 3-4, pp. 255-274, May 31, 2004.

Winter et al., "Thermal Conductivity of Yttria-Stabilzed Zzirconia-Hafnia Solid Solutions", Acta Materialia, vol. No. 54, Issue No. 19, pp. 5051-5059, Nov. 2006.

Matsumoto et al., "Thermal Conductivity and Thermal Cycle Life of La2O3 and HfO2 Doped ZrO2—Y2O3 Coatings Produced by EB-PVD", Surface and Coatings Technology, vol. No. 203, Issue No. 19, pp. 2835-2840, Jun. 25, 2009.

PCT Search Report and Written Opinion issued in connection with corresponding Application No. PCT/US2012/059841 on Jul. 24, 2013.

Unofficial English Translation of Japanese Office Action issued in connection with related JP Application No. 2014-535892 on Jan. 27, 2015.

Unofficial English translation of Office Action issued in connection with corresponding CN Application No. 201280050181.8 on Dec. 25, 2014.

* cited by examiner

THERMAL BARRIER COATING SYSTEMS AND PROCESSES THEREFOR

CROSS REFERENCE TO RELATED APPLICATIONS

This application claims the benefit of U.S. Provisional Application No. 61/546,793, filed Oct. 13, 2011, the contents of which are incorporated herein by reference.

BACKGROUND OF THE INVENTION

This invention relates to coatings capable of use on components exposed to high temperatures, such as the hostile thermal environment of a gas turbine engine. More particularly, this invention is directed to a thermal barrier coating (TBC) capable of exhibiting resistance to thermal cycling and infiltration by contaminants, for example, of types that may be present in the operating environment of a gas turbine engine.

The use of thermal barrier coatings (TBCs) on components such as combustors, high pressure turbine (HPT) blades, vanes and shrouds is increasing in commercial as well as military gas turbine engines. The thermal insulation provided by a TBC enables such components to survive higher operating temperatures, increases component durability, and improves engine reliability. TBCs are typically formed of a ceramic material and deposited on an environmentally-protective bond coat to form what is termed a TBC system. Bond coat materials widely used in TBC systems include oxidation-resistant overlay coatings such as MCrAlX (where M is iron, cobalt and/or nickel, and X is yttrium or another rare earth element), and diffusion coatings such as diffusion aluminides that contain aluminum intermetallics. Bond coat materials are typically selected to be capable of forming a continuous and adherent oxide scale on their surface to promote the adhesion of the ceramic coating to the bond coat. The oxide scale can be formed by subjecting the bond coat to an oxidizing environment, such that the scale is sometimes referred to as a thermally-grown oxide (TGO).

Notable examples of ceramic materials for TBCs include zirconia partially or fully stabilized with yttria (yttrium oxide; $Y_2O_3$) or another oxide, such as magnesia, ceria, scandia and/or calcia, and optionally other oxides to reduce thermal conductivity. Binary yttria-stabilized zirconia (YSZ) is widely used as a TBC material because of its high temperature capability, low thermal conductivity, and relative ease of deposition. Zirconia is stabilized to inhibit a tetragonal to monoclinic crystal phase transformation at about 1000° C., which results in a volume change that can cause spallation. At room temperature, the more stable tetragonal phase is obtained and the monoclinic phase is minimized if zirconia is stabilized by at least about six weight percent yttria. A stabilizer (e.g., yttria) content of seventeen weight percent or more ensures a fully stable cubic crystal phase. The conventional practice has been to partially stabilize zirconia with six to eight weight percent yttria (6-8% YSZ) to obtain a TBC that is adherent and spallation-resistant when subjected to high temperature thermal cycling. Furthermore, partially stabilized YSZ (e.g., 6-8% YSZ) is known to be more erosion-resistant than fully stabilized YSZ (e.g., 20% YSZ).

Various process can be used to deposit TBC materials, including thermal spray processes such as air plasma spraying (APS), vacuum plasma spraying (VPS), low pressure plasma spraying (LPPS), and high velocity oxy-fuel (HVOF). TBCs employed in the highest temperature regions of gas turbine engines are often deposited by a physical vapor deposition (PVD), and particularly electron beam physical vapor deposition (EBPVD), which yields a columnar, strain-tolerant grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma/cathodic arc deposition, and all forms of melting and evaporation deposition processes (e.g., laser melting, etc.). TBCs formed by the various methods noted above generally have a lower thermal conductivity than a dense ceramic of the same composition as a result of the presence of microstructural defects and pores at and between grain boundaries of the TBC microstructure.

Under service conditions, hot section engine components protected by a TBC system can be susceptible to various modes of damage, including erosion, oxidation and corrosion from exposure to the gaseous products of combustion, foreign object damage (FOD), and attack from environmental contaminants. The source of environmental contaminants is ambient air, which is drawn in by the engine for cooling and combustion. The type of environmental contaminants in ambient air will vary from location to location, but can be of a concern to aircraft as their purpose is to move from location to location. Environmental contaminants that can be present in the air include sand, dirt, volcanic ash, sulfur in the form of sulfur dioxide, fly ash, particles of cement, runway dust, and other pollutants that may be expelled into the atmosphere, such as metallic particulates, for example, magnesium, calcium, aluminum, silicon, chromium, nickel, iron, barium, titanium, alkali metals and compounds thereof, including oxides, carbonates, phosphates, salts and mixtures thereof. These environmental contaminants are in addition to the corrosive and oxidative contaminants that result from the combustion of fuel. However, all of these contaminants can adhere to the surfaces of the hot section components, including those that are protected with a TBC system.

In order for a TBC to remain effective throughout the planned life cycle of the component it protects, it is important that the TBC has and maintains integrity throughout the life of the component, including when exposed to contaminants. Some contaminants may result in TBC loss over the life of the components. For example, particulates of calcia (CaO), magnesia (MgO), alumina (aluminum oxide; $Al_2O_3$) and silica (silicon dioxide; $SiO_2$) are often present in environments containing fine sand and/or dust. When present together at elevated temperatures, calcia, magnesia, alumina and silica can form a eutectic compound referred to herein as CMAS. A particular composition that has been identified for CMAS contains about 35 mol % CaO, about 10 mol % MgO, about 7 mol % $Al_2O_3$, and about 48 mol % $SiO_2$, along with about 3 mol % $Fe_2O_3$ and about 1.5 mol % NiO. CMAS has a relatively low melting temperature, such that during turbine operation the CMAS that deposits on a component surface can melt, particularly if surface temperatures exceed about 2240° F. (1227° C.). Molten CMAS is capable of infiltrating the porosity within TBCs. For example, CMAS is capable of infiltrating into TBCs having columnar structures, dense vertically-cracked TBCs, and the horizontal splat boundaries of TBCs deposited by thermal and plasma spraying. The molten CMAS resolidifies within cooler subsurface regions of the TBC, where it interferes with the compliance of the TBC and can lead to spallation and degradation of the TBC, particularly during thermal cycling as a result of interfering with the ability of the TBC to expand and contract. In addition to loss of compliance, deleterious chemical reactions with yttria and zirconia within the TBC, as well as with the thermally-grown oxide at the bond coating/TBC interface, can occur and cause degradation of the TBC system. Once the passive thermal barrier protection provided by the TBC has been lost, continued operation of the engine will lead to oxidation of the base metal beneath the TBC system, which may ultimate lead to failure of the component by burn through cracking.

Attempts to mitigate the effect of the CMAS on high pressure turbine blades have included the application of a thin layer of alumina on the surface of the TBC to increase the melting point of CMAS by about 100 to 150° F. (38° C. to 66° C.). The addition of the alumina layer provides an increase in operating temperature of up to about 2400° F. (1316° C.) with reduced infiltration of liquid CMAS. However, grinding during manufacture and assembly, as well as grinding and rubbing with turbine shrouds during gas turbine engine operation, result in the use and reliance on the alumina layer difficult and impractical. In addition, the alumina layer adds manufacturing cost and complexity, especially for turbine blades that are subjected to gas and particle erosion and may have different requirements for the alumina coating in order to minimize erosion. In addition, thicker alumina layers are subject to coefficient of thermal expansion mismatches within the TBC coating system, resulting in thermal strains during cycling.

In view of the above, it can be appreciated that there are certain problems, shortcomings or disadvantages associated with the prior art, and that it would be desirable if systems and methods were available that are capable of promoting the resistance of components to contaminants, such as CMAS, and particularly gas turbine engine components that operate at temperatures above the melting temperatures of contaminants.

BRIEF DESCRIPTION OF THE INVENTION

The present invention provides a coating system and a process by which the coating system can be deposited to be resistant to contaminants, and particularly resistant to infiltration and damage caused by CMAS.

According to a first aspect of the invention, a coating system is provided on a surface region of a component. The coating system includes a bond coat and inner and outer ceramic layers overlying the bond coat. Each of the inner and outer ceramic layers has a microstructure characterized by splats and horizontal porosity. The inner ceramic layer overlies the bond coat, consists essentially of zirconia stabilized by about 6 to about 9 weight percent yttria, and has a thickness and porosity level. The outer ceramic layer overlies and contacts the inner ceramic layer to define the outermost surface of the coating system. The outer ceramic layer consists essentially of zirconia stabilized by about 25 to about 75 weight percent yttria, has a thickness that is less than the thickness of the inner ceramic layer, and has a porosity level that is lower than the inner ceramic layer.

According to a second aspect of the invention, a process is provided for forming a coating system on a component. The process includes depositing a bond coat on a surface of the component, depositing an inner ceramic layer on the bond coat, and then depositing an outer ceramic layer on the inner ceramic layer to define an outermost surface of the coating system. The inner and outer ceramic layers are deposited using a thermal spray process to yield a microstructure characterized by splats and horizontal porosity. The inner ceramic layer consists essentially of zirconia stabilized by about 6 to about 9 weight percent yttria and is deposited to have a thickness and a porosity level. The outer ceramic layer consists essentially of zirconia stabilized by about 25 to about 75 weight percent yttria, and is deposited to have a thickness that is less than the thickness of the inner ceramic layer and a porosity level that is lower than the inner ceramic layer. The inner and outer ceramic layers are then heat treated to a temperature and for a duration sufficient to relieve stresses therein induced by the depositing steps.

A technical effect of the invention is the ability of the coating system to withstand thermal cycling when subjected to CMAS contaminants. The high yttria content of the outer ceramic layer enables the outer ceramic layer to react with CMAS to form a protective layer that inhibits further infiltration of molten CMAS into the coating system. Significantly, the relative thicknesses and densities of the inner and outer ceramic layers have been shown to be critical to the spallation resistance of the coating system. In particular, the spallation resistance of the coating system has been shown to be significantly enhanced by limiting the thickness of the outer ceramic layer relative to the thickness of the inner ceramic layer and by ensuring that the outer ceramic layer is denser (less porous) than the inner ceramic layer.

Other aspects and advantages of this invention will be better appreciated from the following detailed description.

DETAILED DESCRIPTION OF THE INVENTION

The present invention is generally applicable to components subjected to high temperatures, and particularly to components such as the high and low pressure turbine vanes (nozzles) and blades (buckets), shrouds, combustor liners and augmentor hardware of gas turbine engines. The invention provides TBC systems that are suitable for protecting the surfaces of gas turbine engine components that are subjected to hot combustion gases. While the advantages of this invention will be described with reference to gas turbine engine components, the teachings of the invention are generally applicable to any component on which a TBC may be used to protect the component from a high temperature environment.

Figure 1:
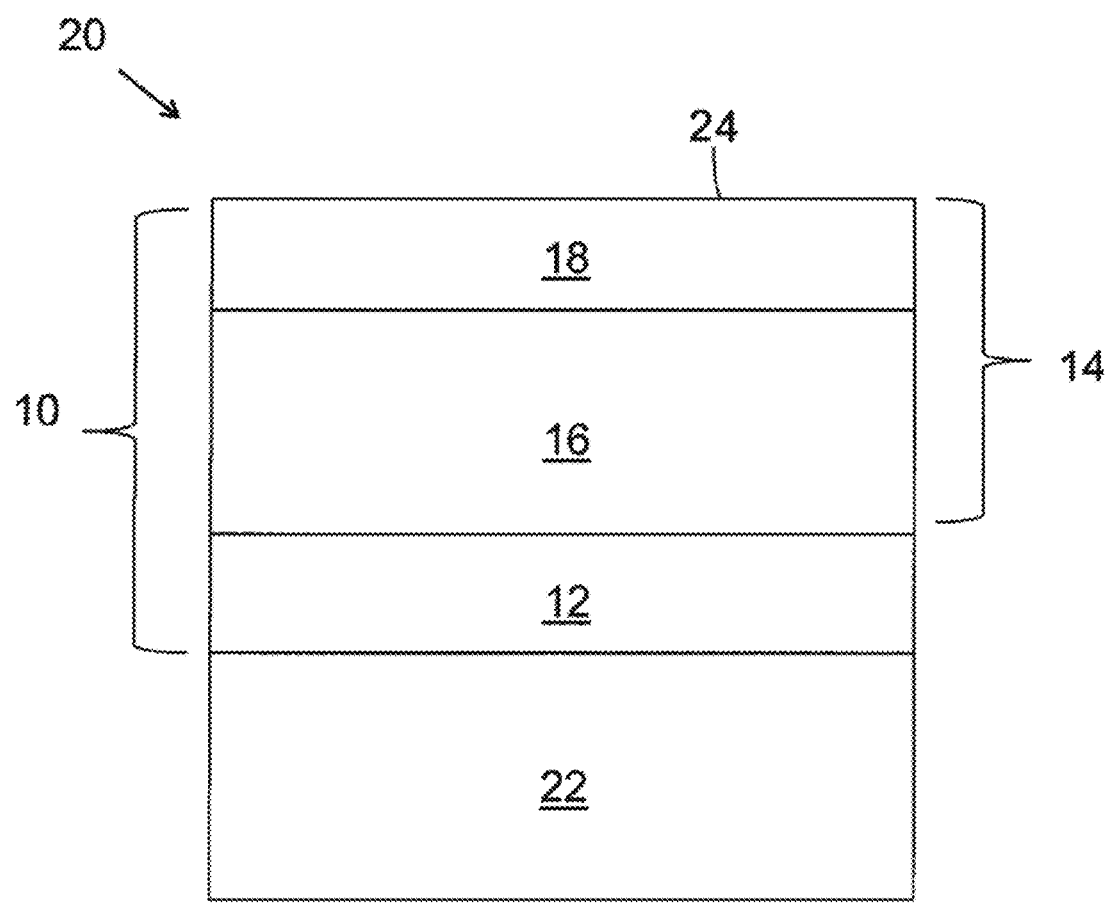
FIG. 1 schematically represents a cross-section through a TBC system.

An embodiment of a TBC system 10 of this invention is schematically represented in FIG. 1 as being applied to the surface of a substrate 22, which in combination with the TBC system 10 yields a coated component 20. The TBC system 10 is shown as including a bond coat 12 that overlies the surface of a substrate 22, the latter of which may be a superalloy or another high temperature material. The substrate 22 is typically the base material of the component 20 protected by the TBC system 10, though the substrate 22 may instead be a coating on the component. The bond coat 12 may be an aluminum-rich composition of a type typically used with TBC systems for gas turbine engine components, such as an overlay coating of an MCrAlX alloy or a diffusion coating such as a diffusion aluminide (including diffusion aluminide coatings modified by a precious metal, for example, platinum) of a type known in the art. A particular example is a NiCrAlY composition of a type known in the art. A suitable thickness for the bond coat 12 is about 0.007 inch (about 175 micrometers), though lesser and greater thicknesses are foreseeable as long as the bond coat 12 is capable of providing the desired functions of protecting the substrate 22 and anchoring the TBC system 10. Aluminum-rich bond coats of the types noted above develop an aluminum oxide (alumina) scale (not shown), which is thermally grown by oxidation of the bond coat 12.

Also shown in FIG. 1 is a multilayer TBC 14 overlying the bond coat 12. The TBC 14 comprises an inner TBC layer 16 that has been deposited directly on the bond coat 12 so as to overlie the bond coat 12, and an outer TBC layer 18 that has been deposited directly on the inner TBC layer 16 so as to overlie the inner TBC layer 16 and define the outermost surface 24 of the TBC system 10 and component 20. As such, if the component 20 is subjected to contaminants, the contaminants would be deposited directly onto the surface 24 of the outer TBC layer 18.

According to a preferred aspect of the invention, the inner and outer TBC layers 16 and 18 are formed of YSZ materials having different yttria contents. The yttria content of the outer TBC layer 18 of the TBC 14 is higher than the yttria content on the inner TBC layer 16, and is sufficiently high to promote the ability of the outer TBC layer 18 to react with contaminants that may deposit on the outermost surface 24 of the TBC system 10. A contaminant of particular concern is the aforementioned CMAS, in which case the yttria content of the outer TBC layer 18 is able to react with molten CMAS deposits at temperatures above about 1200° C. (about 2200° F.) to form a protective reaction product that contains calcium yttrium silicate, which is often known as an apatite phase. The reaction product forms a dense adherent sealing layer that protects the underlying TBC system 10 from further infiltration of CMAS. Though the resistance to CMAS infiltration of a YSZ layer containing more than 20 weight percent yttria is taught in U.S. Pat. No. 7,862,901 to Darolia et al., TBC systems within the ranges taught by Darolia et al. were found to be prone to spallation. The present invention is based on the determination that spallation resistance is achieved by more narrowly limiting the yttria content and, in particular, by controlling the relative thicknesses and densities of the inner and outer TBC layers 16 and 18, as discussed below.

Figure 2:
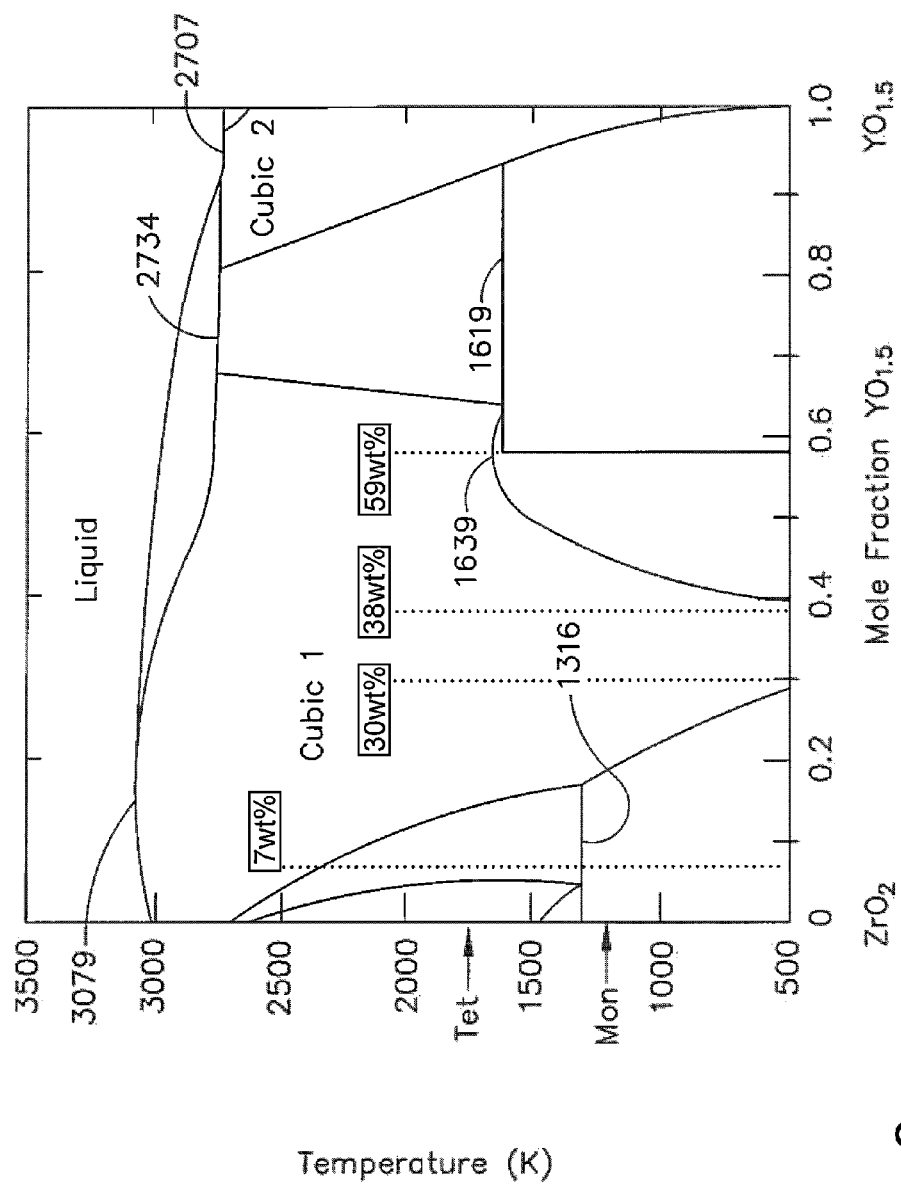
FIG. 2 is a phase diagram for the zirconia-yttria system.

According to preferred aspects of the invention, the outer TBC layer 18 contains about 25 to about 75 wt. % yttria, with the balance being essentially zirconia (allowing for incidental impurities). More preferably, the outer TBC layer 18 contains 30 to 59 wt. % and preferably less than 55 wt. % yttria, with an yttria content of about 38 wt % appearing to be particularly sufficient to enable the reaction that forms the desired calcium yttrium silicate reaction product while offering greater erosion and spallation resistance than higher yttria contents. In contrast, the inner TBC layer 16 has a lower yttria content, and can contain a generally conventional yttria content of about 6 to about 9 wt % yttria, with the balance being essentially zirconia (allowing for incidental impurities). As evident from FIG. 2, the phase diagram for the yttria-zirconia system shows the composition of the inner TBC layer 16 as falling within the metastable tetragonal (or modified tetragonal) phase field, whereas the range of 30 to 59 wt. % yttria preferred for the outer TBC layer 18 lies entirely within the cubic phase field.

As noted above, the outer TBC layer 18 also differs from the inner TBC layer 16 in terms of its density (porosity) and thickness. In particular, the inner TBC layer 16 is deposited in a manner that achieves a relatively porous macrostructure, preferably characterized by a porosity level of about 10 to about 25 volume percent, and more preferably about 10 to about 20 volume percent. In contrast, the outer TBC layer 18 is deposited in a manner that achieves a less porous macrostructure than the inner TBC layer 16. The outer TBC layer 18 preferably has a porosity level of about 3 to about 15 volume percent, and more preferably about 5 to about 10 volume percent. The preferred density range and the relatively higher density of the outer TBC layer 18 is necessary in view of the lower toughness and erosion resistance of the cubic YSZ phase within this layer 18 as compared to the tetragonal YSZ phase within the inner TBC layer 16.

To obtain the desire porosity levels in the TBC layers 16 and 18, the TBC layers 16 and 18 preferably have a noncolumnar structure as a result of being deposited by a thermal spraying technique, for example, plasma spraying (air (APS), vacuum (VPS) and low pressure (LPPS)) or high velocity oxy-fuel (HVOF). As known in the art, thermal spraying involves propelling melted or at least heat-softened particles of a heat fusible material (e.g., metal, ceramic) against a surface, where the particles are quenched and bond to the surface to produce a coating. As such, the inner and outer TBC layers 16 and 18 are deposited in the form of molten "splats," resulting in a microstructure characterized by horizontal porosity resulting from the presence of the splats (flattened grains). The microstructures of either or both TBC layers 16 and 18 may be modified to contain dense vertical cracks of the type taught in U.S. Pat. Nos. 5,073,433, 5,520,516, 5,830, 586, 5,897,921, 5,989,343 and 6,047,539.

The inner and outer TBC layers 16 and 18 and the bond coat 12 may be deposited using the same thermal spray gun. Particular acceptable results, including the desired difference in the densities of the TBC layers 16 and 18, have been obtained by controlling the surface temperatures and varying the standoff distances used to deposit the TBC layers 16 and 18. Particularly suitable results have been obtained by depositing the bond coat 12 and inner TBC layer 16 using relatively conventional plasma spray conditions including a standoff distance of about 4.5 to about 5 inches (about 11.4 to about 12.7 cm) and using sweeping air while maintaining the surface temperature of the bond coat 12 at about 75 to about 200° F. (about 24 to about 93° C.). In addition, particularly suitable results have been obtained by depositing the outer TBC layer 18 using a shorter standoff distance than used to deposit the inner TBC layer 16, for example, about 3 to about 3.25 inch (about 7.6 to about 8.3 cm) using sweeping air while maintaining the deposition surface of the inner TBC layer 16 at a higher temperature than used to deposit the inner TBC layer 16, for example, about 450 to about 550° F. (about 230 to about 260° C.). In other words, the outer TBC layer 18 may be applied using the same thermal spray gun as used to deposit the inner TBC layer 16, but the TBC layer 18 is deposited on a hotter and closer substrate surface than the TBC layer 16. The combined effect of these parameters is to intentionally decrease the porosity of the outer TBC layer 18 relative to the inner TBC layer 16.

Figure 3:
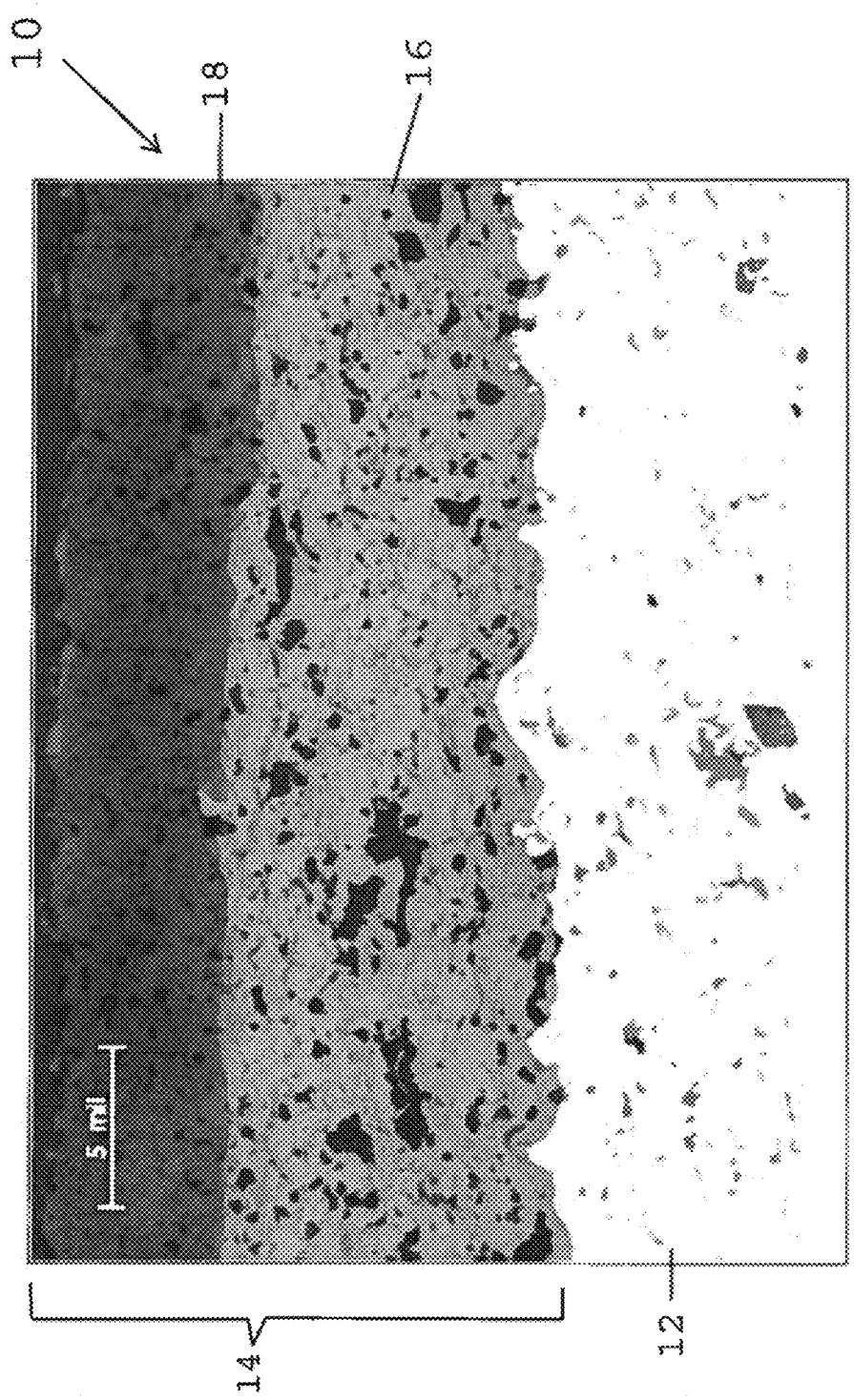
FIG. 3 is a scanned images of a TBC system in accordance with an embodiment of this invention.

FIG. 3 shows a nonlimiting example of a TBC system containing a bond coat and two TBC layers of the types described above. The bond coat appears as the lightest layer in the image, and the outer TBC layer appears as the darkest layer in the image.

Following the deposition of both TBC layers 16 and 18, the TBC system 10 preferably undergoes heat treatment to relieve residual stresses. An exemplary heat treatment is in a temperature range of about 1925 to about 1975° F. (about 1050 to about 1080° C.) in a vacuum for a duration of about two to about four hours. A particularly preferred heat treatment is believed to be about 1975° F. (about 1080° C.) in a vacuum for about four hours. This disclosed heat treatment is merely exemplary and other effective heat treatments may be employed.

Figure 4:
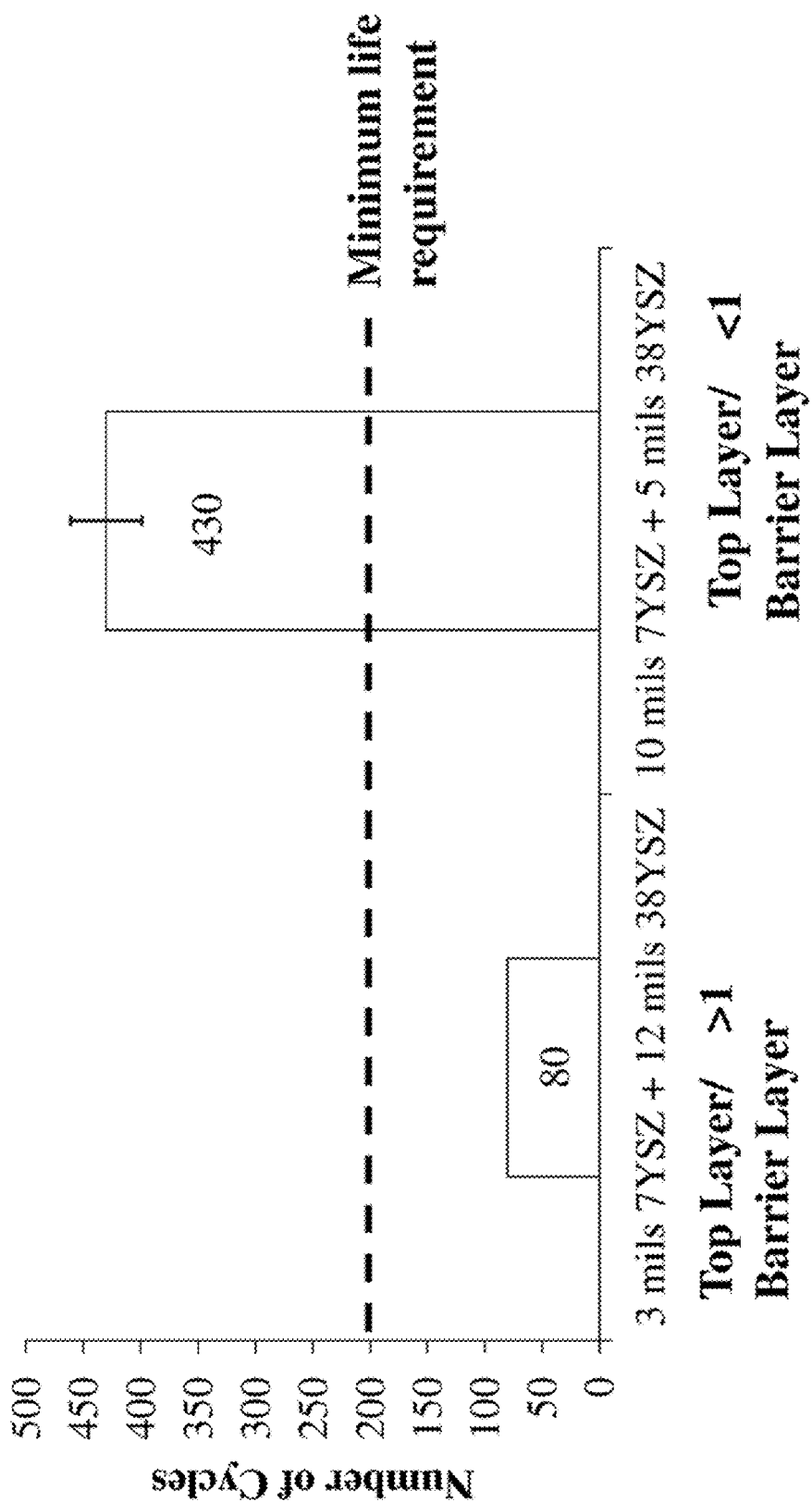
FIG. 4 is a graph comparing the relative resistance of TBC systems within and outside the scope of the invention when subjected to thermal cycling.

As noted above, the outer TBC layer 18 also differs from the inner TBC layer 16 in terms of its thickness. Investigations leading to the present invention evidenced that the relative thickness of the TBC layers 16 and 18 must be controlled in order to achieve improvements in spallation resistance of the TBC system 10, even in the absence of CMAS contaminants. In particular, testing indicated that the thickness ratio of the outer TBC layer 18 to the inner TBC layer 16 must be less than one. FIG. 4 represents data accumulated from furnace cycle testing performed under conditions that entailed one-hour cycles between room temperature and about 2075° F. (about 1135° C.), with a dwell time of about forty-five minutes at peak temperature. Testing of a specimen was terminated when about 20% of the surface area of the TBC system had spalled. Two sets of specimens were evaluated, each deposited on substrates formed of René N5 and provided with a bond coat formed of NiCrAlY. A first set of the specimens had an inner TBC layer of about 7% YSZ that was about 3 mils thick (about 75 micrometers) and an outer TBC layer of about 38% YSZ that was about 12 mils thick (about 300 micrometers). The second set of specimens had an inner TBC layer of about 7% YSZ that was about 10 mils thick (about 250 micrometers) and an outer TBC layer of about 38% YSZ that was about 5 mils thick (about 125 micrometers). The TBC layers were deposited using plasma spray parameters previously described for the inner and outer TBC layers 16 and 18 of this invention. As evident from FIG. 4, the first specimens did not achieve the minimum life requirement identified for the test, whereas the second specimens far exceeded the minimum life requirement. In particular, the specimens with a thickness ratio of less than one (about 0.5) exhibited furnace cycle lives of greater than five times greater than the specimens with a thickness ratio of greater than one (about 4).

From these tests, it was shown that, in addition to the compositional and porosity differences between the inner and outer TBC layers 16 and 18, it is important that their thickness ratio (outer/inner) is not greater than one. From these tests, it was further concluded that preferred thickness ratios are less than one, with ratios of not greater than 0.5 believed to be particularly preferred. The individual thicknesses of the TBC layers 16 and 18 can be varied to achieve the desired ratio. For example, the inner TBC layer 16 may have a thickness of 50 micrometers up to about 500, for example, a nominal thickness of about 250 micrometers, and the outer TBC layer 18 may have a thickness of 25 micrometers up to about 250, for example, a nominal thickness of about 125 micrometers.

The preference for limiting the yttria content of the outer TBC layer 18 was further established through cyclic thermal gradient tests performed at about 2600° F. (about 1425° C.) with specimens coated with an inner layer of 7% YSZ and an outer layer of either 38% YSZ or 55% YSZ. Each layer was deposited by thermal spraying using the appropriate deposition parameters previously described for the inner and outer TBC layers 16 and 18 of this invention, and to have a thickness and porosity within the corresponding ranges described above. The specimen with the outer layer of 55% YSZ spalled at 66 cycles, whereas the specimen with the outer layer of 38% YSZ specimen had not spalled after completing 1983 cycles. Consequently, it was concluded that preferred outer TBC layers 18 of this invention should contain less than 55 wt. % yttria, particular at surface temperatures of about 2600° F. (about 1425° C.).

From the above, it should be appreciated that the characteristics of the outer TBC layer 18, specifically, a higher yttria content, greater density (less porosity), and lesser thickness relative to the inner TBC layer 16, enable the TBC system 10 to not only mitigate the deleterious effects of CMAS deposits, but also exhibit acceptable thermal cycling lives. As such, the TBC system 10 is particularly well suited for protecting hot section components of gas turbine engines, and is capable of enabling such components to operate for longer durations and/or at higher temperatures.

While the invention has been described in terms of specific embodiments, it is apparent that other forms could be adopted by one skilled in the art. Therefore, the scope of the invention is to be limited only by the following claims.

The invention claimed is:

1. A coating system on a surface region of a component, the coating system comprising:
   a bond coat; and
   inner and outer ceramic layers each having a microstructure characterized by splats and horizontal porosity, the inner ceramic layer overlying the bond coat, the inner ceramic layer consisting essentially of zirconia stabilized by about 6 to about 9 weight percent yttria, the inner ceramic layer having a thickness and a porosity level, the outer ceramic layer overlying and contacting the inner ceramic layer and defining an outermost surface of the coating system, the outer ceramic layer consisting essentially of zirconia stabilized by about 25 to about 75 weight percent yttria, the outer ceramic layer having a thickness that is less than the thickness of the inner ceramic layer such that a ratio of the thickness of the outer ceramic layer to that of the inner ceramic layer is not greater than 0.5, and the outer ceramic layer having a porosity level that is lower than the porosity level of the inner ceramic layer as deposited,
   wherein the coating system has a thermal cycle life of at least 200 cycles when subjected to furnace cycle testing comprising one-hour cycles between about room temperature and about 1135 degrees C. with a dwell time of about forty-five minutes at peak temperature, the thermal cycle life ending when about 20% of the surface area of the coating system has spalled.

2. The coating system according to claim 1, wherein the inner ceramic layer has a thickness of at least 50 to about 500 micrometers.

3. The coating system according to claim 1, wherein the outer ceramic layer has a thickness of up to 250 micrometers.

4. The coating system according to claim 1, wherein the outer ceramic layer has a thickness of at least about 25 micrometers.

5. The coating system according to claim 1, wherein the porosity level of the outer ceramic layer throughout the thickness thereof is less than that of the inner ceramic layer.

6. The coating system according to claim 1, wherein the porosity level of the inner ceramic layer is about 10 to about 25 volume percent.

7. The coating system according to claim 1, wherein the porosity level of the outer ceramic layer is about 3 to about 15 volume percent.

8. The coating system according to claim 1, wherein the outer ceramic layer consists essentially of zirconia stabilized by about 38 to less than 55 weight percent yttria.

9. The coating system according to claim 1, wherein the outer ceramic layer consists essentially of a cubic crystal phase and the inner ceramic layer consists essentially of a tetragonal or modified tetragonal crystal phase.

10. The coating system according to claim 1, wherein the outer ceramic layer reacts with a eutectic compound containing calcia, magnesia, alumina and silica to form calcium yttrium silicate at temperatures above 1200° C.

11. The coating system according to claim 10, wherein the component is chosen from the group consisting of high and low pressure turbine vanes and blades, shrouds, combustor liners and augmentor hardware of a gas turbine engine.

12. The coating system according to claim 1, wherein the component is a gas turbine engine component formed of a nickel-base or cobalt-base superalloy.

13. A coating system on a surface region of a component, the coating system comprising:
a bond coat; and
inner and outer ceramic layers each having a microstructure characterized by splats and horizontal porosity, the inner ceramic layer overlying the bond coat, the inner ceramic layer consisting essentially of zirconia stabilized by about 6 to about 9 weight percent yttria, the inner ceramic layer having a thickness and a porosity level, the outer ceramic layer overlying and contacting the inner ceramic layer and defining an outermost surface of the coating system, the outer ceramic layer consisting essentially of zirconia stabilized by about 25 to about 75 weight percent yttria, the outer ceramic layer having a thickness that is less than the thickness of the inner ceramic layer such that a ratio of the thickness of the outer ceramic layer to that of the inner ceramic layer is not greater than 0.7, and the outer ceramic layer having an as-deposited porosity level throughout the thickness thereof that is lower than the porosity level of the inner ceramic layer as deposited;
wherein the coating system has a thermal cycle life of at least 200 cycles when subjected to furnace cycle testing comprising one-hour cycles between about room temperature and about 1135 degrees C. with a dwell time of about forty-five minutes at peak temperature, the thermal cycle life ending when about 20% of the surface area of the coating system has spalled.

* * * * *